(12) United States Patent
Porter et al.

(10) Patent No.: US 11,713,123 B2
(45) Date of Patent: Aug. 1, 2023

(54) LIMITED SWIVEL APPARATUS FOR A PASSENGER SEAT

(71) Applicant: AMI INDUSTRIES, INC., Colorado Springs, CO (US)

(72) Inventors: Ryan Stuart Porter, Monument, CO (US); Keith M. Ferguson, Colorado Springs, CO (US); Scott R. Patterson, Manitou Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 283 days.

(21) Appl. No.: 17/073,184

(22) Filed: Oct. 16, 2020

(65) Prior Publication Data

US 2021/0101684 A1 Apr. 8, 2021

Related U.S. Application Data

(62) Division of application No. 16/059,334, filed on Aug. 9, 2018, now Pat. No. 10,822,090, which is a division
(Continued)

(51) Int. Cl.
*B64D 11/06* (2006.01)
*B60N 2/14* (2006.01)
(Continued)

(52) U.S. Cl.
CPC ............ *B64D 11/0639* (2014.12); *B60N 2/06* (2013.01); *B60N 2/14* (2013.01); *B60N 2/146* (2013.01);
(Continued)

(58) Field of Classification Search
CPC .. B64D 11/0639; B64D 11/0648; B60N 2/14; B60N 2/06; B60N 2/146
See application file for complete search history.

(56) References Cited

U.S. PATENT DOCUMENTS

| 3,113,804 A | 12/1963 | Ritter |
| 4,401,287 A | 8/1983 | Moeser |

(Continued)

FOREIGN PATENT DOCUMENTS

| CN | 1952464 | 3/2012 |
| CN | 104061951 | 9/2014 |

(Continued)

OTHER PUBLICATIONS

China National Intellectual Property Admiistration, Chinese First Office Action dated Dec. 18, 2020 in Application No. 201710160477.X.

(Continued)

*Primary Examiner* — Tan Le
(74) *Attorney, Agent, or Firm* — Snell & Wilmer L.L.P.

(57) ABSTRACT

The present disclosure provides a swivel stop comprising a rotating member, a first boss coupled to the rotating member and a second boss coupled to the rotating member, and a second plate having a first interference surface and a second interference surface. An interference between the first boss and the first interference surface and the second boss and the second interference surface tends to limit the rotation of the rotating member with respect to the second plate. The swivel stop may further comprise a rail wherein the second plate is configured to translate along the rail.

8 Claims, 13 Drawing Sheets

Related U.S. Application Data of application No. 15/074,802, filed on Mar. 18, 2016, now Pat. No. 10,071,805.

(51) Int. Cl.
| | |
|---|---|
| *B60N 2/06* | (2006.01) |
| *B63B 29/06* | (2006.01) |
| *B63B 29/04* | (2006.01) |
| *A47C 3/18* | (2006.01) |

(52) U.S. Cl.
CPC .......... *B64D 11/0648* (2014.12); *A47C 3/18* (2013.01); *B63B 29/04* (2013.01); *B63B 29/06* (2013.01)

(56) References Cited

U.S. PATENT DOCUMENTS

| | | | |
|---|---|---|---|
| 5,082,328 | A | 1/1992 | Garelick |
| 5,941,493 | A | 8/1999 | Cheng |
| 6,447,065 | B1 | 9/2002 | Ropp |
| 6,520,579 | B2 | 2/2003 | Kassai |
| 7,152,836 | B2 | 12/2006 | Pfister et al. |
| 7,155,836 | B2 | 1/2007 | Kwon et al. |
| 7,641,163 | B2 | 1/2010 | O'Keene |
| 9,211,812 | B2 | 12/2015 | Haller |
| 9,889,772 | B2 | 2/2018 | Murray |
| 10,071,805 | B2 | 9/2018 | Porter et al. |
| 10,822,090 | B2 | 11/2020 | Porter et al. |
| 2010/0072801 | A1* | 3/2010 | Adelsperger ........... B60N 2/797 297/344.21 |
| 2011/0133030 | A1* | 6/2011 | Kennedy ............ B64D 11/0649 244/118.5 |
| 2013/0161990 | A1 | 6/2013 | Olsen |
| 2014/0191081 | A1 | 7/2014 | Ward et al. |
| 2017/0210251 | A1 | 7/2017 | Murray |
| 2017/0267127 | A1 | 9/2017 | Patterson et al. |
| 2017/0267355 | A1 | 9/2017 | Porter et al. |
| 2021/0101684 | A1 | 4/2021 | Porter et al. |

FOREIGN PATENT DOCUMENTS

| | | |
|---|---|---|
| CN | 204019549 | 12/2014 |
| CN | 104434147 | 3/2015 |
| EP | 3219617 | 10/2022 |

OTHER PUBLICATIONS

China National Intellectual Property Admiistration, Chinese Search Report dated Dec. 8, 2020 n Application No. 201710160477.X.
EP Search Report dated Jul. 28, 2017 in EP Application No. 17161418.3.
USPTO; Restriction Requirement dated Mar. 31, 2017 in U.S. Appl. No. 15/074,802.
USPTO; Non-Final Office Action dated Sep. 12, 2017 in U.S. Appl. No. 15/074,802.
USPTO; Final Office Action dated Apr. 18, 2018 in U.S. Appl. No. 15/074,802.
USPTO; Notice of Allowance dated Jul. 2, 2018 in U.S. Appl. No. 15/074,802.
EP Communication Pursuant to AEticle 94(3) EPC dated Jul. 2, 2018 in EP Application No. 17161418.3.
USPTO; Requirement for Restriction dated Dec. 30, 2019 in U.S. Appl. No. 16/059,334.
USPTO; Notice of Allowance dated Aug. 3, 2020 in U.S. Appl. No. 16/059,334.
National Institute of Industrial Property; Brazilian Office Action dated Mar. 29, 2022 in Application No. BR102017004602-8.
National Institute of Industrial Property; Brazilian Search Report dated Mar. 29, 2022 in Application Mo BR102017004602-8.
Canadian Intellectual Property Office, Canadian Office Action dated Oct. 20, 2022 in Application No. 2,956,232.
China National Intellectual Property Administration, Second Chinese Office Action dated May 14, 2021 in Application No. 201710160477.X.
China National Intellectual Property Administration, Chinese Search Report dated May 7, 2021 in Application No. 201710160477.X.
Canadian Intellectual Property Office, Canadian Office Action dated Mar. 30, 2023 in Application No. 2,956,232.

* cited by examiner

LIMITED SWIVEL APPARATUS FOR A PASSENGER SEAT

CROSS-REFERENCE TO RELATED APPLICATIONS

This application is a divisional of, claims priority to, U.S. application Ser. No. 16/059,334, filed Aug. 9, 2018 and titled "LIMITED SWIVEL APPARATUS FOR A PASSENGER SEAT" (hereinafter the '334 Application). The '334 Application is a divisional of, claims priority to, U.S. application Ser. No. 15/074,802, filed Mar. 18, 2016, now U.S. Pat. No. 10,071,805, and titled "LIMITED SWIVEL APPARATUS FOR A PASSENGER SEAT," (hereinafter the '802 Application). The '334 Application and the '802 Application are hereby incorporated by reference in their entirety.

FIELD

The present disclosure relates to devices for vehicle interior fixtures. More specifically, the disclosure described relates to improved articulation mechanisms for aircraft cabin seats.

BACKGROUND

Aircraft cabin seats tend to have different restrictions on articulation and rotation depending on their location in the cabin. Such varying properties may result in structurally different designs tending to increase part count and certification costs.

SUMMARY

In various embodiments, the present disclosure provides a swivel stop comprising a first boss and a second boss, at least one of the first boss or the second boss coupled to a rotating member; and a second plate proximate the rotating member and having a first interference surface and a second interference surface, wherein at least one of a first interference between the first boss and the first interference surface or a second interference between the second boss and the second interference surface limits the rotation of the rotating member with respect to the second plate.

In various embodiments, the swivel stop comprises a rail wherein the second plate is configured to translate along the rail. In various embodiments, the second plate comprises an aperture. In various embodiments, at least one of the first boss or the second boss is disposed within the aperture. In various embodiments, the rotating member comprises a disk. In various embodiments, the first boss may be coupled 180 degrees relative to the rotating member apart from the second boss. In various embodiments, the coupling between the rotating member and the first boss is a removable coupling. In various embodiments, the second plate comprises any rigid structural material. In various embodiments, a boss comprises at least one of polymer, aluminum, aluminum alloy, steel, stainless steel, titanium, or titanium alloy. In various embodiments, the rotation of the rotating member with respect to the second plate is configured to range from 0 degrees to 360 degrees.

In various embodiments, the present disclosure provides a cabin fixture comprising a pedestal having a cutout, an axle having a portion disposed within the cutout wherein the axle is configured to translate within the cutout, a first boss coupled to a rotating member and the rotating member coupled to the axle, and a second plate proximate the rotating member having a first interference surface wherein an interference between the first boss and the first interference surface tends to limit the rotation of the rotating member with respect to the second plate.

In various embodiments, the cabin fixture comprises a rail wherein the second plate is configured to translate along the rail. In various embodiments, the second plate translates in response to a translation of the axle. In various embodiments, the second plate comprises an aperture. In various embodiments, the rotating member comprises a disk. In various embodiments, the pedestal comprises a friction surface. In various embodiments, the axle is disposed within the aperture. In various embodiments, the second plate comprises any rigid structural material.

In various embodiments, the present disclosure provides a method of manufacturing a swivel stop comprising coupling a first boss and a second boss to a rotating member, forming a second plate having a first interference surface and a second interference surface, configuring an interference between the first boss and the first interference surface and an interference between the second boss and the second interference surface such that rotation of the rotating member with respect to the second plate tends to be limited when the second plate is disposed proximate the rotating member. The method may further comprise configuring the second plate to translate along a rail.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to "without contact" (or similar phrases) may also include reduced contact or minimal contact. Surface shading lines may be used throughout the figures to denote different parts but not necessarily to denote the same or different materials. In some cases, reference coordinates may be specific to each figure.

All ranges and ratio limits disclosed herein may be combined. It is to be understood that unless specifically stated otherwise, references to "a," "an," and/or "the" may include one or more than one and that reference to an item in the singular may also include the item in the plural.

In various embodiments, a swivel stop for aircraft cabin fixtures is disclosed. A swivel stop, according to various embodiments, may comprise a first boss coupled to a rotating member, a second boss coupled to the rotating member, and a second plate proximate the rotating member having a first interference surface and a second interference surface. In various embodiments, a first interference between the first boss and the first interference surface and a second interference between the second boss and the second interference surface tends to limit the rotation of the rotating member with respect to the second plate. In various embodiments, at least one of the first interference surface or the second interference surface describe a curve. The swivel stop may further comprise a rail wherein the second plate is configured to translate along the rail. The second plate may translate along the rail in response to a rotation of the rotating member. In various embodiments, the translation may describe a curve. The second plate may comprise an aperture and at least one of the first boss or the second boss may be disposed within the aperture. In various embodiments, the second plate may comprise any rigid or structural material. The rotating member may comprise a brake disk and may have a friction surface. The first boss may be coupled at any angle from the second boss and, in various embodiments, may be 180 degrees apart from the second boss with respect to the rotating member. The first boss may be removably coupled to the rotating member. In various embodiments, the second boss may be an axle. The interference may be configured to limit the rotation of the rotating member with respect to the second plate to a desired range. In various embodiments, the desired range may be up to 360 degrees. In various embodiments, the desired range may be up to 0 degrees. In various embodiments, the desired range may be up to about 270 degrees, and up to about ±30 degrees, where the term "about" in this context only means ±2 degrees. In various embodiments, the desired range may be asymmetric.

In various embodiments, a cabin fixture comprises a pedestal, an axle, and a swivel stop wherein the swivel stop comprises a first boss coupled to a rotating member, the rotating member coupled to the axle, a second plate proximate the rotating member having a first interference surface wherein an interference between the first boss and the first interference surface tends to limit the rotation of the rotating member with respect to the second plate. In various embodiments, the first interference surface may describe a curve. In various embodiments, the second plate may comprise any rigid structural material, including but not limited to at least one of a polymer, composite, aluminum, aluminum alloy, steel, stainless steel, titanium, or titanium alloy. The cabin fixture may further comprise a rail wherein the second plate is configured to translate along the rail. In various embodiments, the translation may describe a curve. The rotating member rotates with respect to the second plate in response to rotation of the axle. The second plate may translate in response to the rotation of the rotating member. In various embodiments, the axle may translate with respect to the pedestal. The rotating member may translate in response to the translation of the axle and the second plate may translate along the rail in response to the translation of the axle. The interference between the first boss and the first interference surface tends to limit the rotation of the rotating member with respect to the second plate and tends to limit the translation of the second plate along the rail.

Figure 1A:
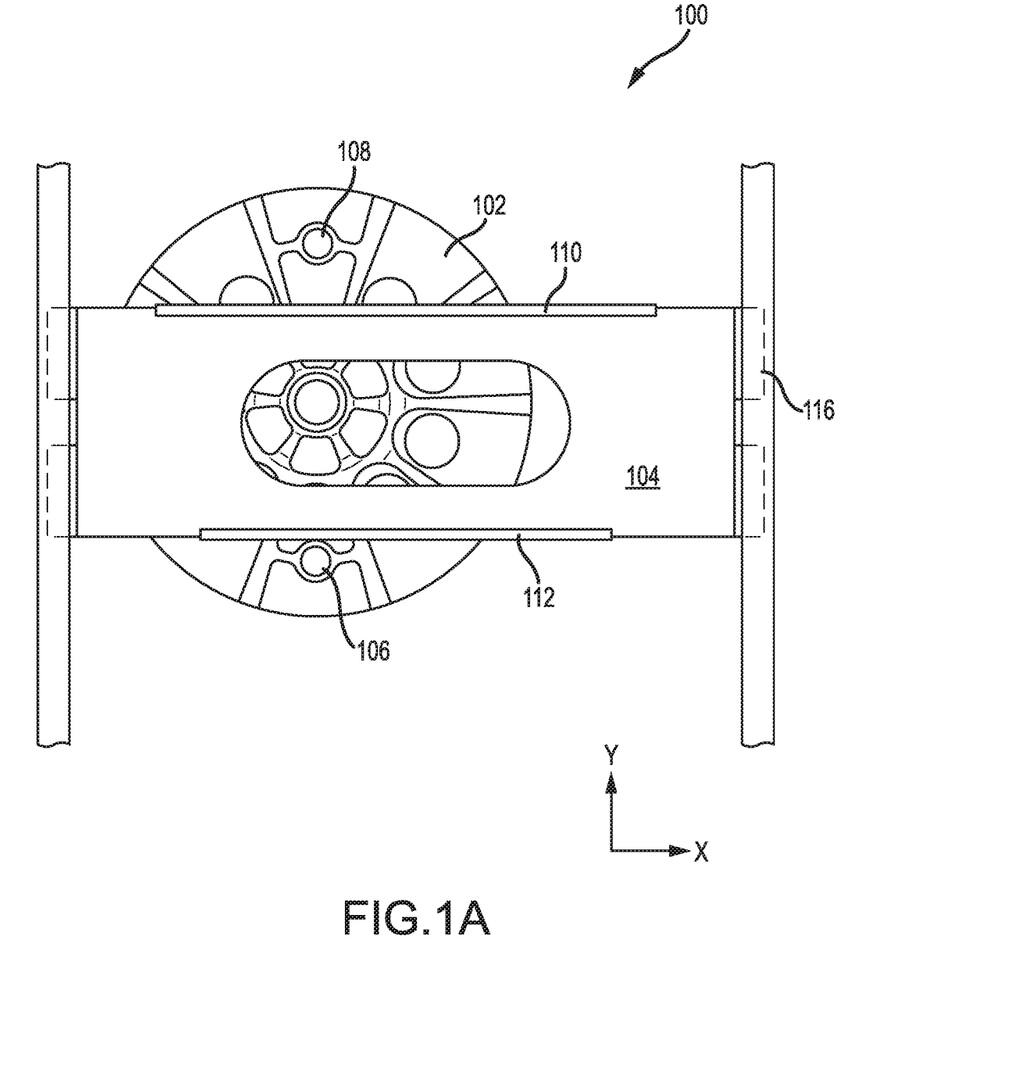
FIG. 1A illustrates a swivel stop, in accordance with various embodiments.

With reference now to FIG. 1A, in accordance with various embodiments, a swivel stop 100 comprises a brake plate 102 disposed proximate a second plate 104. A first boss 108 and a second boss 106 are coupled to the brake plate 102. Second plate 104 has a first interference surface 110 and a second interference surface 112. Xy axes are shown for convenience. Second plate 104 is coupled to rail 116 and is configured to translate along rail 116 in the y-direction.

Figure 2A:
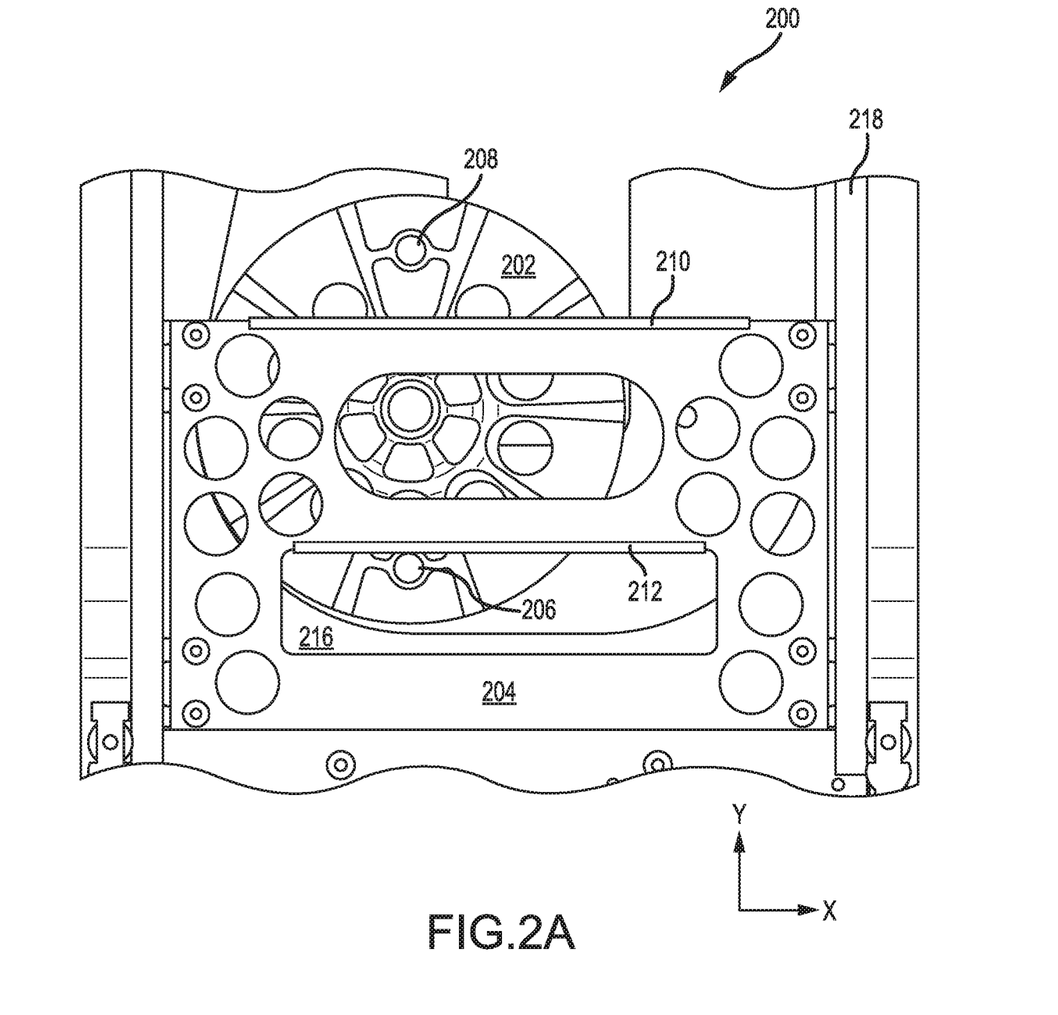
FIG. 2A illustrates a swivel stop, in accordance with various embodiments.

With reference now to FIG. 2A, in accordance with various embodiments, a swivel stop 200 comprises a first plate 202 disposed proximate a second plate 204. A first boss 208 and a second boss 206 are coupled to the first plate 202. Second plate 204 has a first interference surface 210, a second interference surface 212, and an aperture 216. A boss, such as second boss 206, may be disposed in an aperture such as aperture 216. Xy axes are shown for convenience. Second plate 204 is coupled to rail 218 and is configured to translate along rail 218 in the y-direction.

Figure 2B:
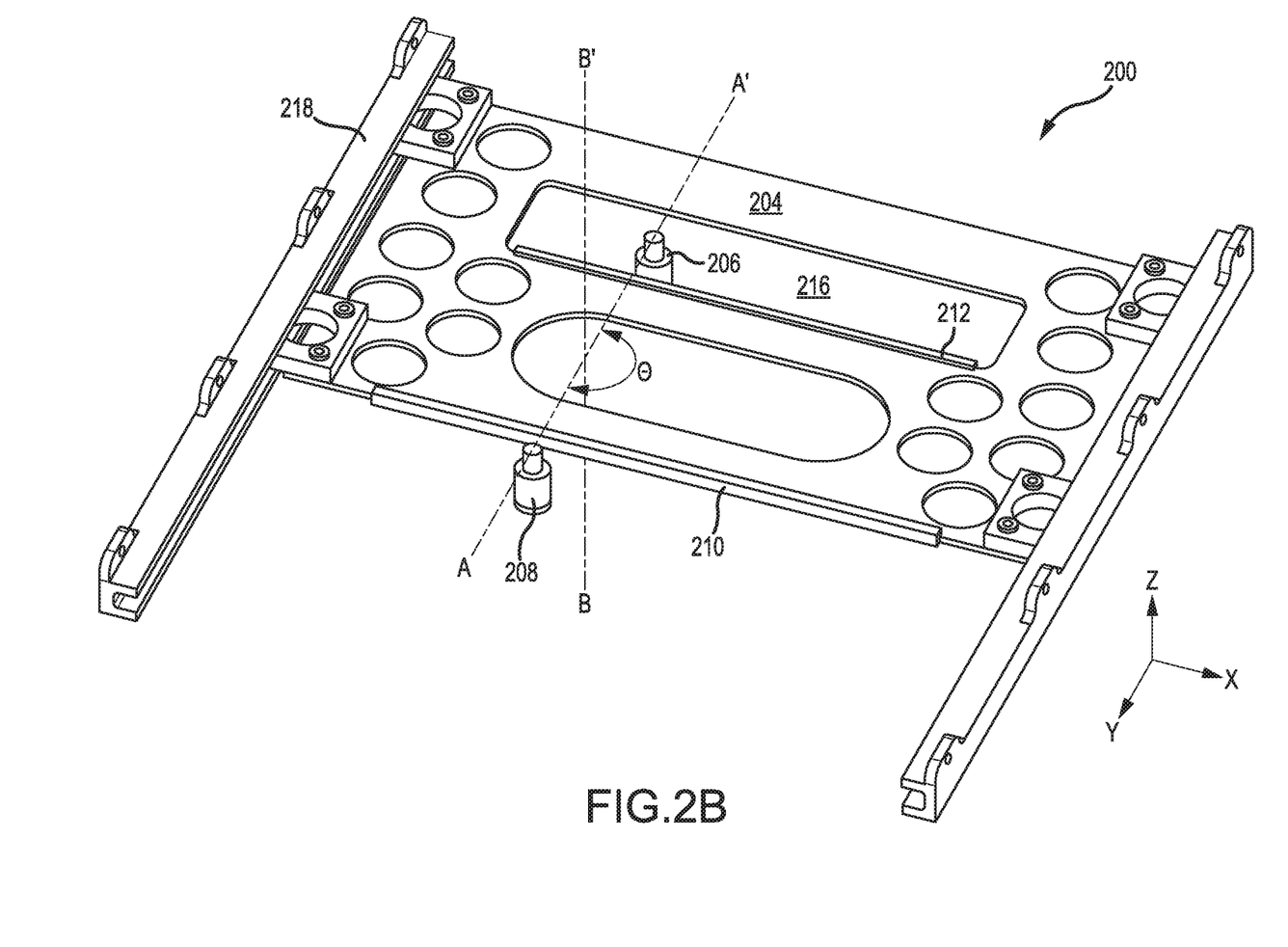
FIG. 2B illustrates a perspective view of a swivel stop with the rotating member omitted for clarity, in accordance with various embodiments.

In accordance with various embodiments and with reference now to FIG. 2B, a swivel stop 200 is shown in perspective with the first plate 202 omitted for ease of illustration. Xyz axes are shown for convenience, with z extending perpendicular to the xy plane. In that regard, a measurement point displaced in the positive z-axis direction from a given reference point may be considered "above" or on "top" of the given reference point. In contrast, a measurement point displaced in the negative z-axis direction from the given reference point may be considered "below" or on "bottom" of the given reference point. In that regard, the terms "top" and "bottom" may refer to relative positions along the z-axis. For example, first plate 202 as depicted in FIG. 2A, is above second plate 204. Axis A-A' is orthogonal to and passes through the axis of rotation, B-B', of the first plate 202. The first boss 208 is coupled to first plate 202 along the A-A' axis at an angle θ, about the axis of rotation B-B', to the second boss 206. In various embodiments, angle θ may be 180 degrees and second boss 206 may lie along the A-A' axis.

In various embodiments, a swivel stop may be made of polymer, composite, aluminum, aluminum alloy, steel, stainless steel, titanium, or titanium alloy. In various embodiments, the second plate may be a composite sandwich construction such as one of honeycomb core laminated between carbon fiber panels. In various embodiments, an interference surface may be a polymer bushing comprising a polymeric material, such as thermoplastic. The polymer bushing may comprise an aliphatic or semi-aromatic polyamide, such as one commonly referred to in trade as nylon.

Figure 3A:
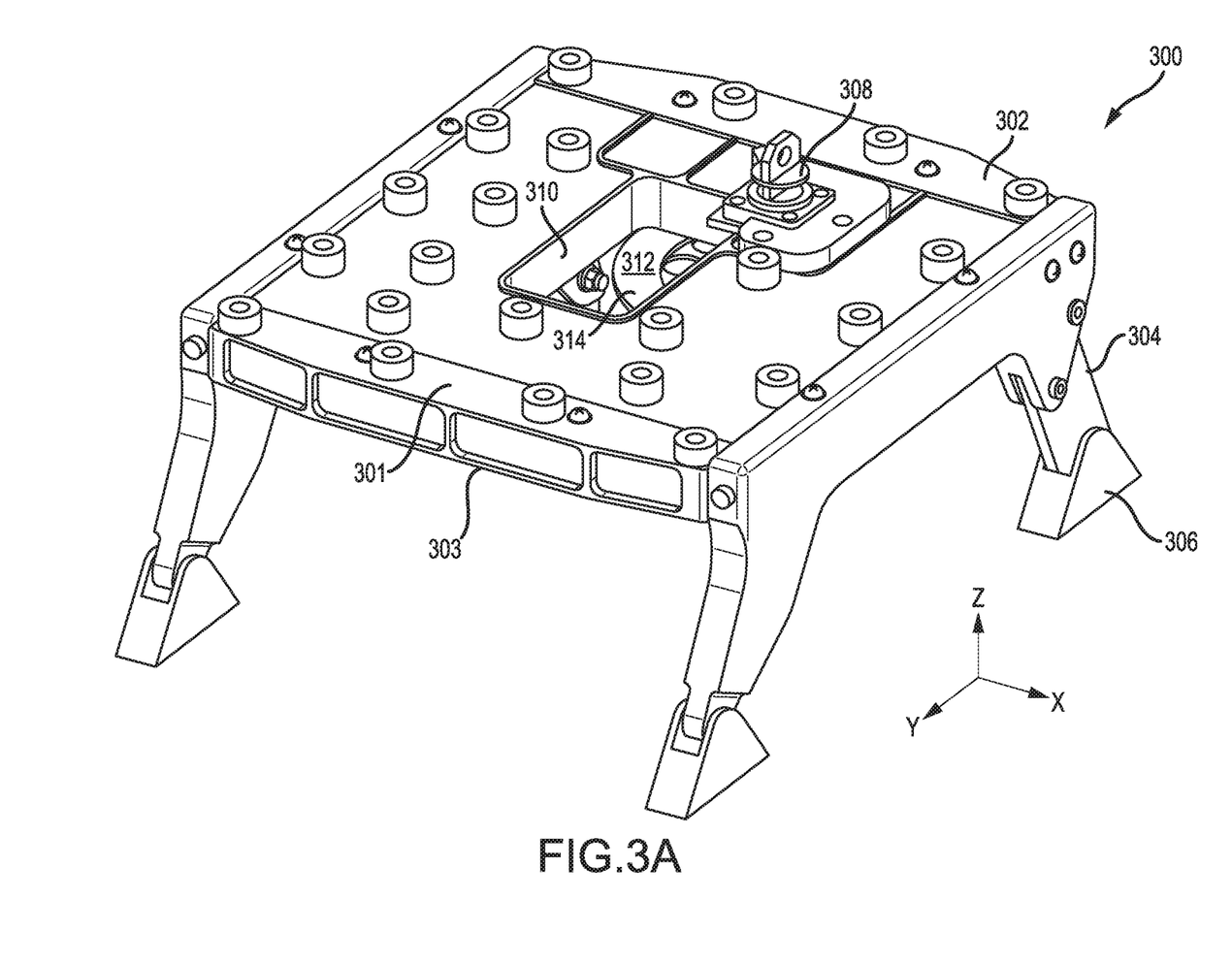
FIG. 3A illustrates a cabin fixture, in accordance with various embodiments.
Figure 3B:
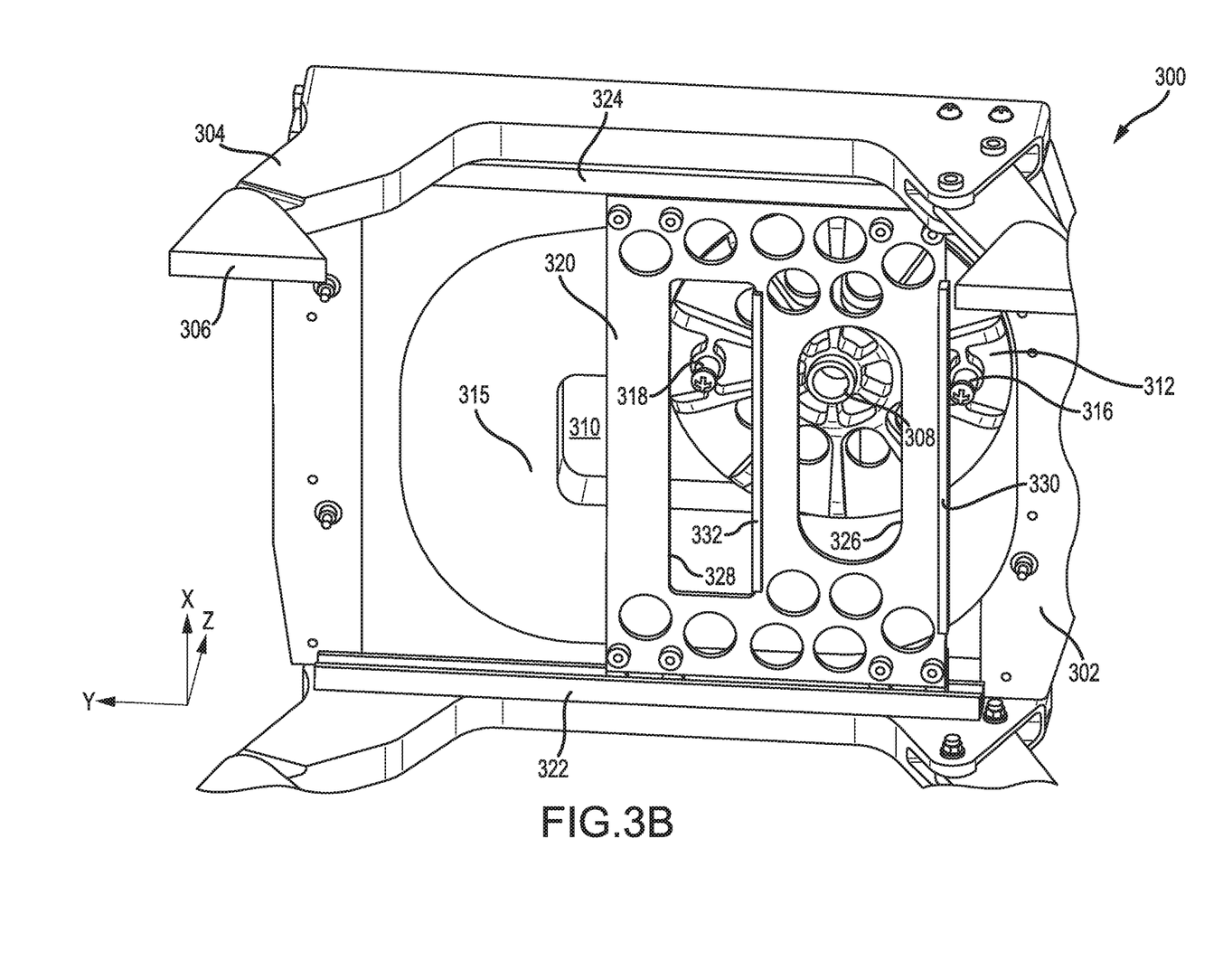
FIG. 3B illustrates a bottom up view of a cabin fixture, in accordance with various embodiments.

With reference now to FIGS. 3A and 3B, and in accordance with various embodiments, a cabin fixture 300 comprises a pedestal 302, an axle 308, a brake plate 312, a first boss 316, and a second plate 320. Pedestal 302 has top deck 301, bottom deck 303, brake plate cutout 310, and has legs 304 with feet 306 configured to couple the pedestal to the floor of an aircraft cabin. Axle 308 is coupled perpendicular to brake plate 312 and is disposed within brake plate cutout 310 and is configured to translate within the cutout. Brake plate cutout 310 tends to allow axle 308 to translate in the xy plane within the boundary defined by the brake plate cutout 310. Brake plate 312 has friction surface 314 and is disposed below the top deck 301 of pedestal 302 with friction surface 314 proximate friction surface 315, as shown in FIG. 3B, of bottom deck 303.

In accordance with various embodiments and with reference now to FIG. 3B, a bottom up view of cabin fixture 300 is provided to show details of the brake plate 312 and the second plate 320. The first boss 316 is coupled to the brake plate 312 and a second boss 318 is coupled to the brake plate 312. The second plate 320 is disposed proximate the brake plate 312. Axle 308 passes through brake plate cutout 310 of pedestal 302 and is coupled perpendicular to the brake plate 312. Second plate 320 has a first interference surface 330, a second interference surface 332, and an aperture 328. Second plate 320 further comprises axle clearance cutout 326 which tends to allow the axle 308 to translate in the xy plane. In various embodiments, axle 308 may not penetrate second plate 320. Thus, in such embodiments, axle clearance cutout 326 may be omitted. The second plate 320 is coupled to rail 324 and rail 322 and is configured to translate along rail 324 and rail 322 in the y-direction.

In various embodiments, a cabin fixture may be made of polymer, composite, aluminum, aluminum alloy, steel, stainless steel, titanium, or titanium alloy. In various embodiments, the second plate may be a composite sandwich construction such as one of honeycomb core laminated between carbon fiber panels. In various embodiments, an interference surface may be a polymer bushing comprising a polymeric material, such as thermoplastic. The polymer bushing may comprise an aliphatic or semi-aromatic polyamide, such as one commonly referred to in trade as nylon.

Figure 4A:
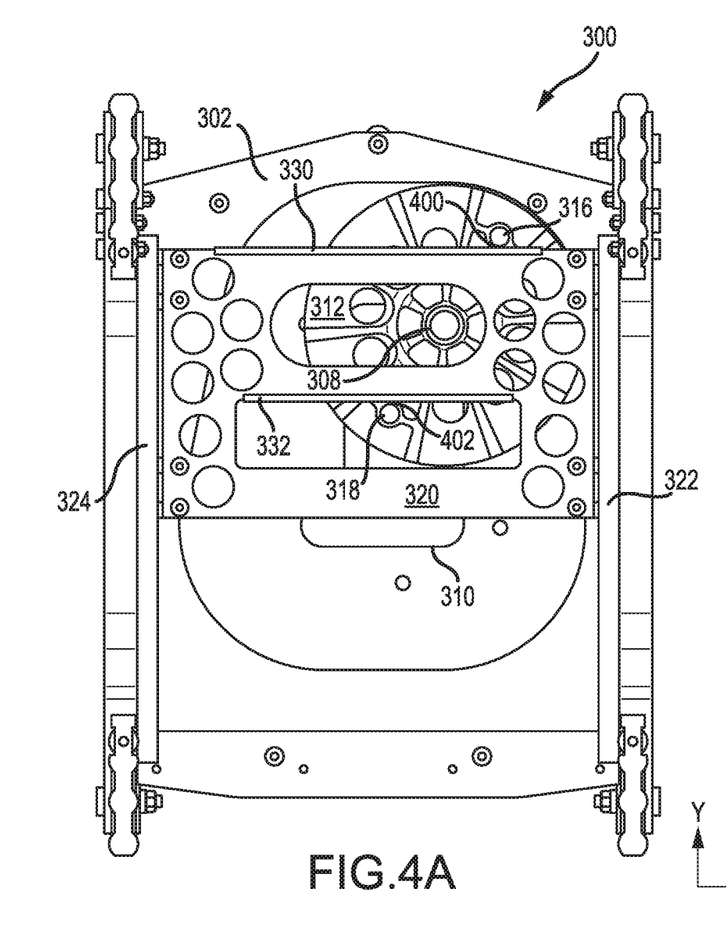
FIG. 4A illustrates a cabin fixture at the limit of rotation, in accordance with various embodiments.

In accordance with various embodiments and with reference now to FIG. 4A, a bottom up view of cabin fixture 300 with the swivel stop at a limit of rotation is provided. In response to rotation of axle 308, brake plate 312 is rotated with respect to second plate 320. First boss 316 and second boss 318 rotate with brake plate 312 until the first boss 316 contacts the first interference surface 330 and the second boss 318 contacts the second interference surface 332. An interference 400 between the first boss 316 and the first interference surface 330 and an interference 402 between the second boss 318 and the second interference surface 332 tends to limit the rotation of the brake plate 312 with respect to the second plate 320 to about 30 degrees, where the term "about" in this context means ±2 degrees.

Figure 4B:
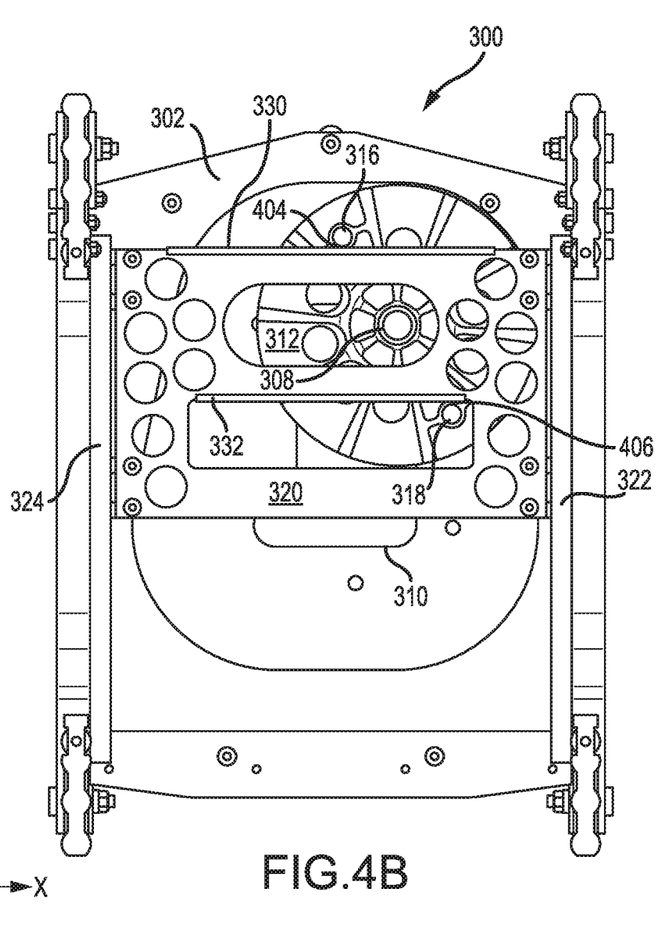
FIG. 4B illustrates a cabin fixture at the limit of rotation, in accordance with various embodiments.

In accordance with various embodiments and with reference now to FIG. 4B, a bottom up view of cabin fixture 300 with the swivel stop at a limit of rotation is provided. In response to rotation of axle 308, brake plate 312 is rotated with respect to second plate 320. First boss 316 and second boss 318 rotate with brake plate 312 until the first boss 316 contacts the first interference surface 330 and the second boss 318 contacts the second interference surface 332. An interference 404 between the first boss 316 and the first interference surface 330 and an interference 406 between the second boss 318 and the second interference surface 332 tends to limit the rotation of the brake plate 312 with respect to the second plate 320 to about −30 degrees, where the term "about" in this context means ±2 degrees.

Figure 5A:
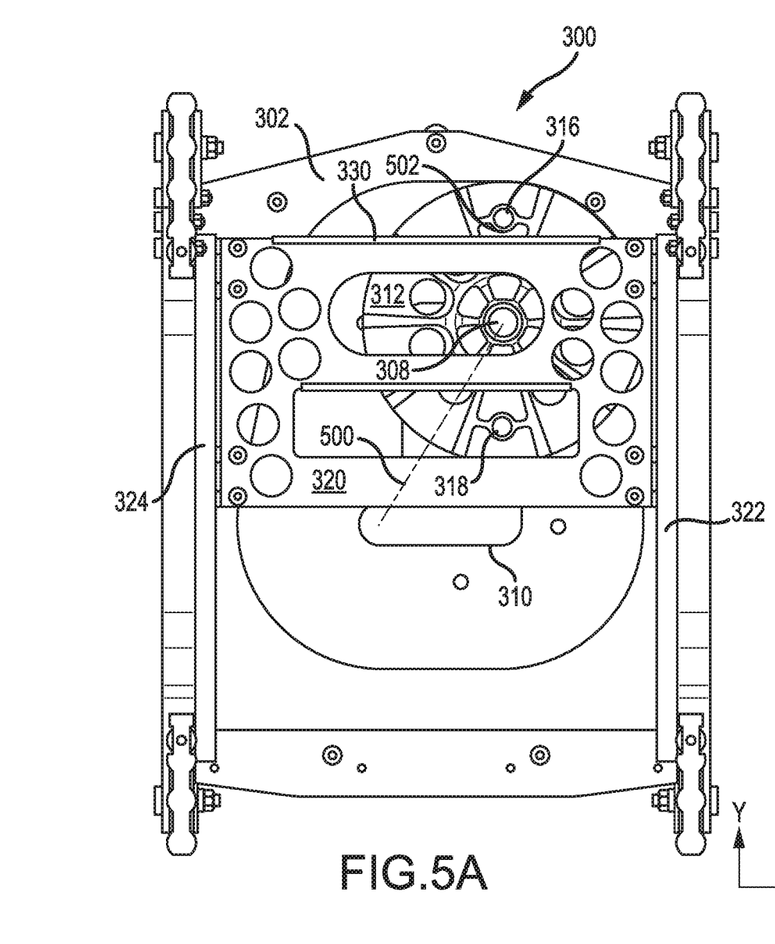
FIG. 5A illustrates a cabin fixture at a limit of translation, in accordance with various embodiments.
Figure 5B:
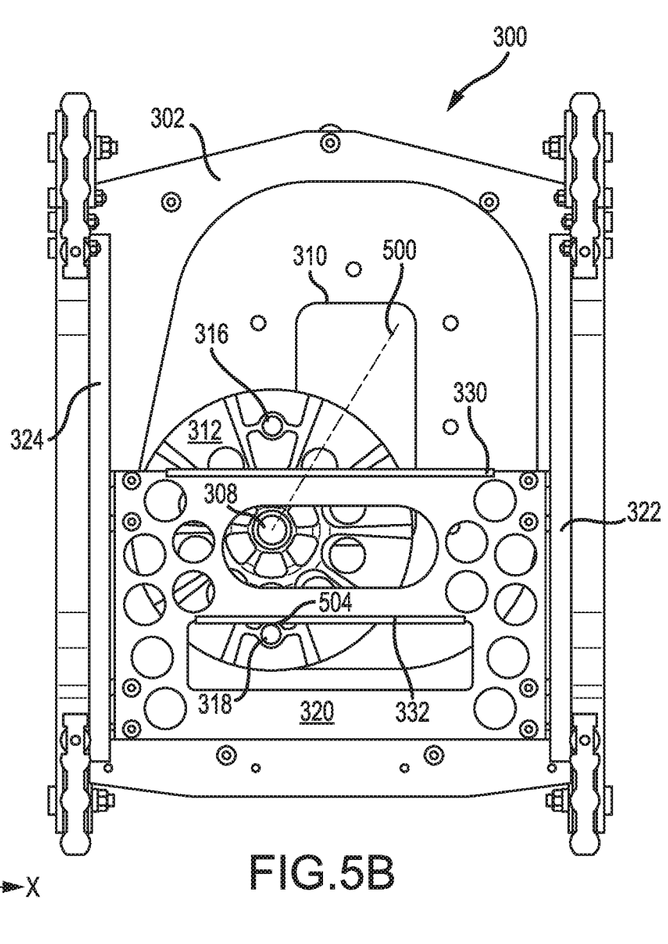
FIG. 5B illustrates a cabin fixture at a limit of translation, in accordance with various embodiments.

In accordance with various embodiments and with reference now to FIGS. 5A and 5B, a bottom up view of cabin fixture 300 is shown illustrating a translation of the axle 308 in the xy plane along path 500 between limits defined by corners of the brake plate cutout 310. Brake plate 312 is coupled to axle 308 and translates in the xy plane along path 500 in response to translation of the axle 308. As brake plate 312 translates in the negative y-direction, first boss 316 contacts first interference surface 330 generating interference 502 and second plate 320 begins to translate in the negative y-direction along rail 322 and rail 324 in response to the negative y-direction translation of the axle 308. At the end of path 500, axle 308 reaches the negative y-direction limit of translation defined by the brake plate cutout 310. Second plate 320 may continue to translate in the negative y-direction along rail 322 and rail 324 in response to inertia until second interference surface 332 contacts second boss 318 which generates an interference 504 tending to limit the negative y-direction translation of second plate 320.

Figure 1B:
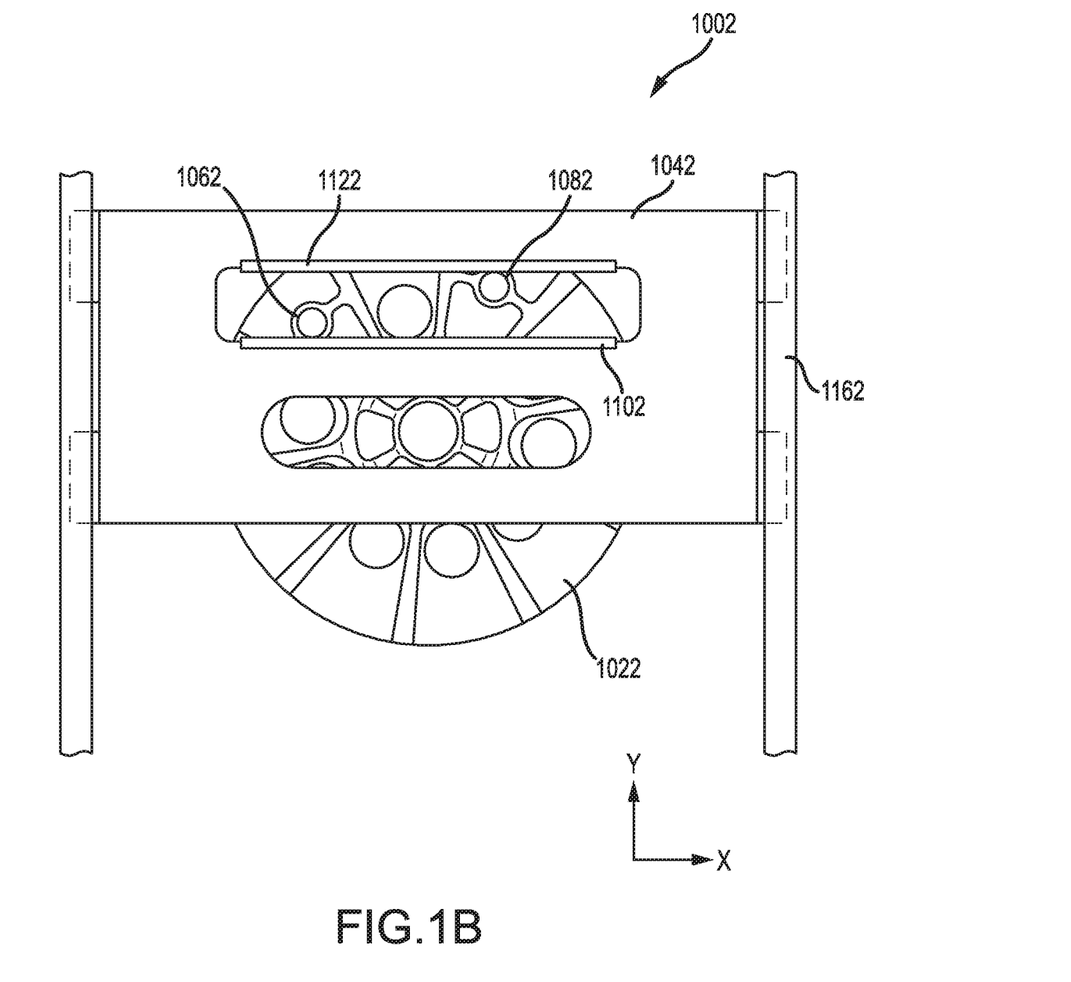
FIG. 1B illustrates a swivel stop, in accordance with various embodiments.

With reference now to FIGS. 1B and 2A in accordance with various embodiments, a swivel stop 1002 comprises a brake plate 1022 disposed proximate a second plate 1042. A first boss 1082 and a second boss 1062 are coupled to the brake plate 1022. Second plate 1042 has a first interference surface 1102 and a second interference surface 1122. Second plate 1042 is coupled to rail 1162 and is configured to translate along rail 1162 in the y-direction. First boss 1082 and second boss 1062 are disposed in an aperture, such as aperture 216, having a perimeter with the first interference surface 1102 and the second interference surface 1122 coincident with a portion of the perimeter of the aperture. As brake plate 1022 rotates clockwise with respect to the second plate 1042, the first boss 1082 tends to contact the first interference surface 1102 and the second boss 1062 tends to contact the second interference surface 1122 thereby tending to limit the clockwise rotation of the brake plate 1022. As brake plate 1022 rotates counter-clockwise with respect to the second plate 1042, the first boss 1082 tends to contact the second interference surface 1122 and the second boss 1062 tends to contact the first interference surface 1102 thereby tending to limit the counter-clockwise rotation of the brake plate 1022.

Figure 1C:
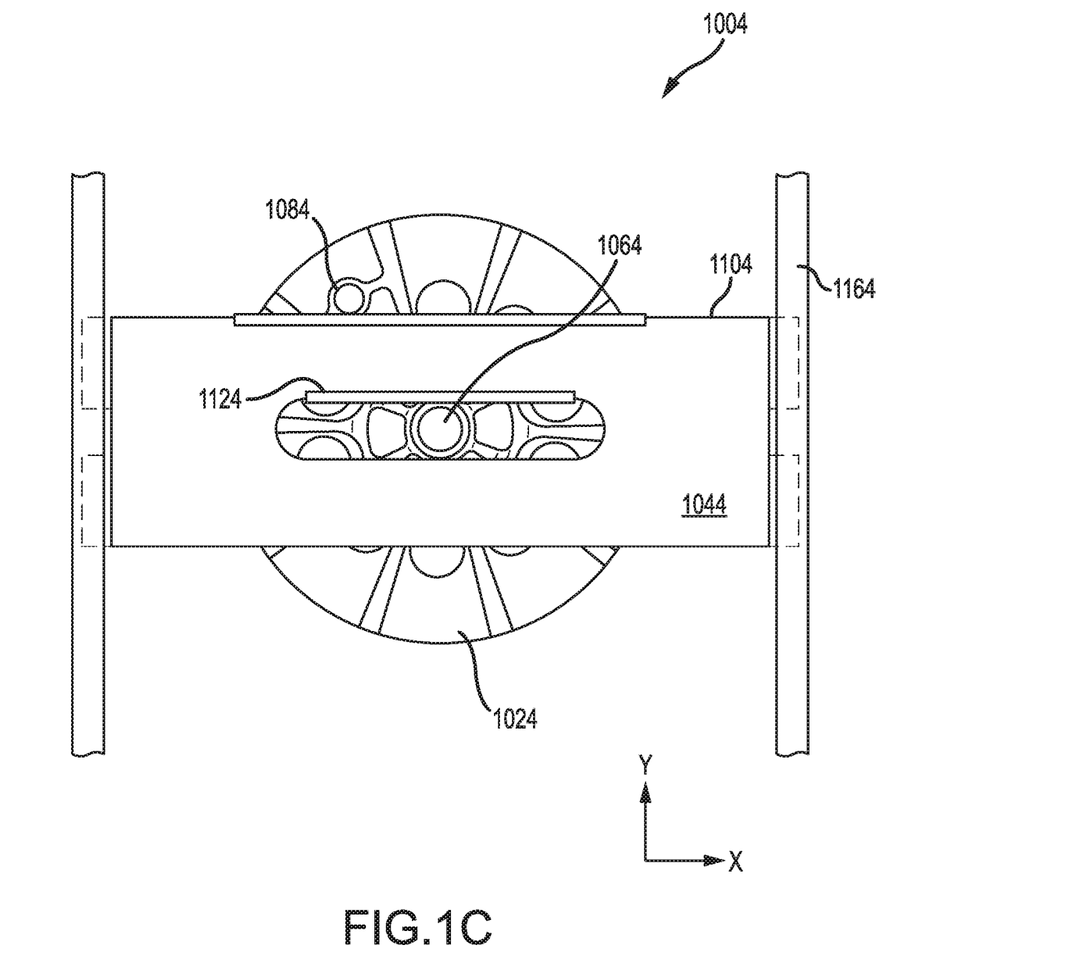
FIG. 1C illustrates a swivel stop, in accordance with various embodiments.

With reference now to FIGS. 1C and 3B, in accordance with various embodiments, a swivel stop 1004 comprises a brake plate 1024 disposed proximate a second plate 1044. A first boss 1084 and an axle 1064 are coupled to the brake plate 1024. Second plate 1044 has a first interference surface 1104 and a second interference surface 1124. Second plate 1044 is coupled to rail 1164 and is configured to translate along rail 1164 in the y-direction. The axle 1064 is disposed in an axle clearance cutout, such as cutout 326. Second interference surface 1124 may be coincident with a portion of an axle clearance cutout, such as cutout 326, and tend to allow the axle 1064 to translate, with respect to the second plate 1044, in the x-direction. As brake plate 1024 rotates clockwise with respect to the second plate 1044, the first boss 1084 tends to contact the first interference surface 1104 and the axle 1064 tends to contact the second interference surface 1124 thereby tending to limit the clockwise rotation of the brake plate 1024. As brake plate 1024 rotates counter-clockwise with respect to the second plate 1044, the first boss 1084 tends to contact the first interference surface 1104 and the axle 1064 tends to contact the second interference surface 1124 thereby tending to limit the counter-clockwise rotation of the brake plate 1024. In various embodiments, an interference between axle 1064 and second interference surface 1124 may tend to prevent the axle 1064 from translating, with respect to second plate 1044, in the y-direction.

Figure 1D:
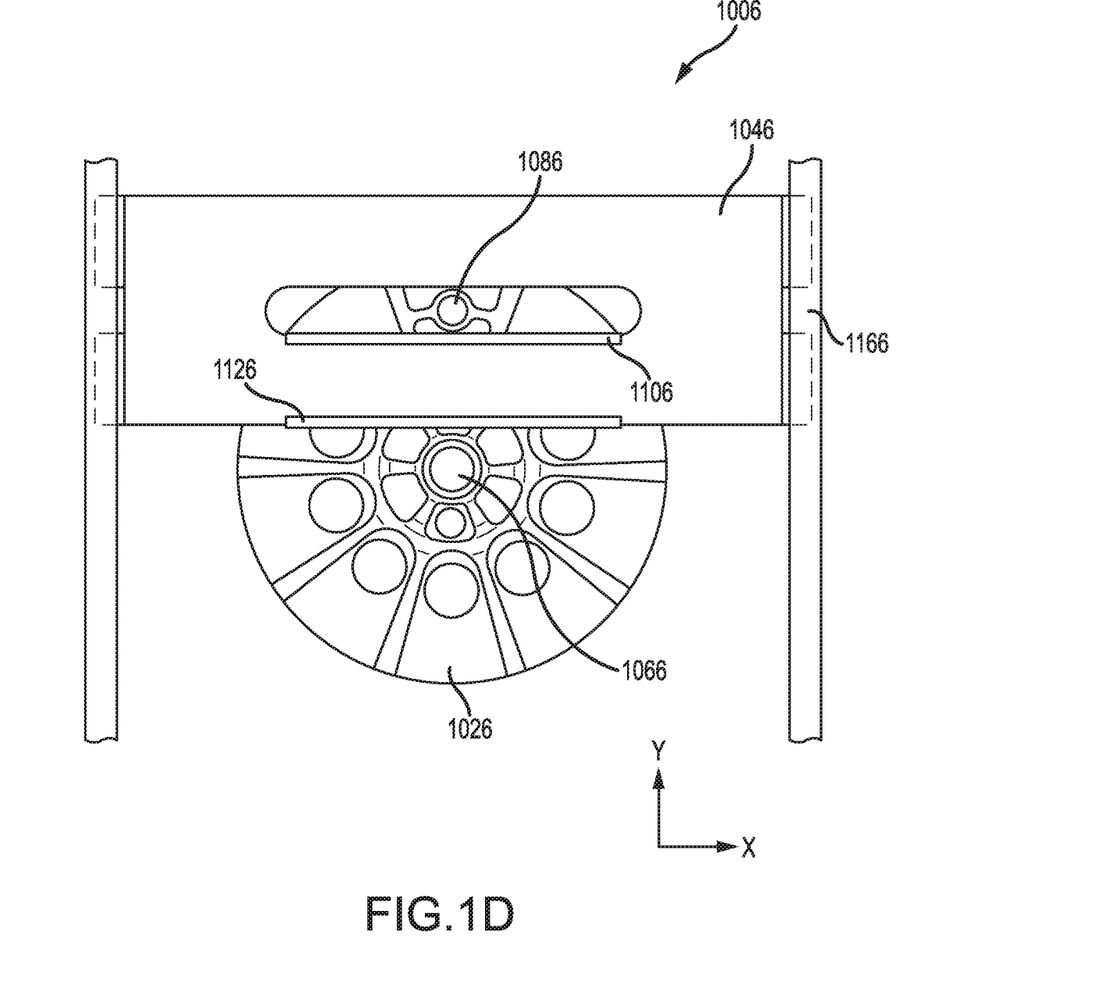
FIG. 1D illustrates a swivel stop, in accordance with various embodiments.

With reference now to FIGS. 1D and 2B, in accordance with various embodiments, a swivel stop 1006 comprises a brake plate 1026 disposed proximate a second plate 1046. A first boss 1086 and an axle 1066 are coupled to the brake plate 1026. Second plate 1046 has a first interference surface 1106 and a second interference surface 1126. Second plate 1046 is coupled to rail 1166 and is configured to translate along rail 1166 in the y-direction. First boss 1086 is disposed in an aperture, such as aperture 216, having a perimeter with the first interference surface 1106 coincident with a portion of the perimeter of the aperture. As brake plate 1026 rotates clockwise with respect to the second plate 1046, the first boss 1086 tends to contact the first interference surface 1106 and the axle 1066 tends to contact the second interference surface 1126 thereby tending to limit the clockwise rotation of the brake plate 1026. As brake plate 1026 rotates counter-clockwise with respect to the second plate 1046, the first boss 1086 tends to contact the first interference surface 1106 and the axle 1066 tends to contact the second interference surface 1126 thereby tending to limit the counter-clockwise rotation of the brake plate 1026.

Figure 1E:
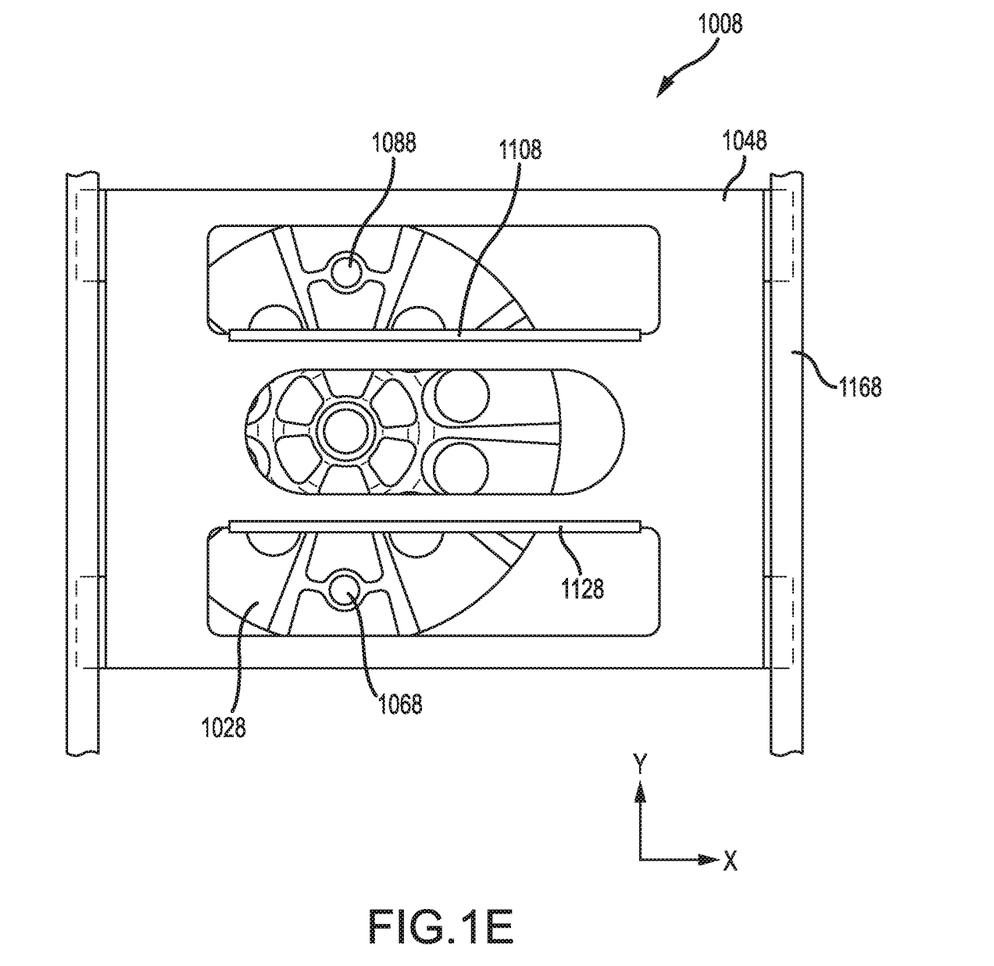
FIG. 1E illustrates a swivel stop, in accordance with various embodiments.

With reference now to FIGS. 1E and 2B, in accordance with various embodiments, a swivel stop 1008 comprises a brake plate 1028 disposed proximate a second plate 1048. A first boss 1088 and a second boss 1068 are coupled to the brake plate 1028. Second plate 1048 has a first interference surface 1108 and a second interference surface 1128. Second plate 1048 is coupled to rail 1168 and is configured to translate along rail 1168 in the y-direction. First boss 1088 is disposed in a first aperture, such as aperture 216, having a first perimeter with the first interference surface 1108 coincident with a portion of the first perimeter. Second boss 1068 is disposed within a second aperture having a second perimeter with the second interference surface 1128 coincident with a portion of the second perimeter. As brake plate 1028 rotates clockwise with respect to the second plate 1048, the first boss 1088 tends to contact the first interference surface 1108 and the second boss 1068 tends to contact the second interference surface 1128 thereby tending to limit the clockwise rotation of the brake plate 1028. As brake plate 1028 rotates counter-clockwise with respect to the second plate 1048, the first boss 1088 tends to contact the first interference surface 1108 and the second boss 1068 tends to contact the second interference surface 1128 thereby tending to limit the counter-clockwise rotation of the brake plate 1028.

Figure 1F:
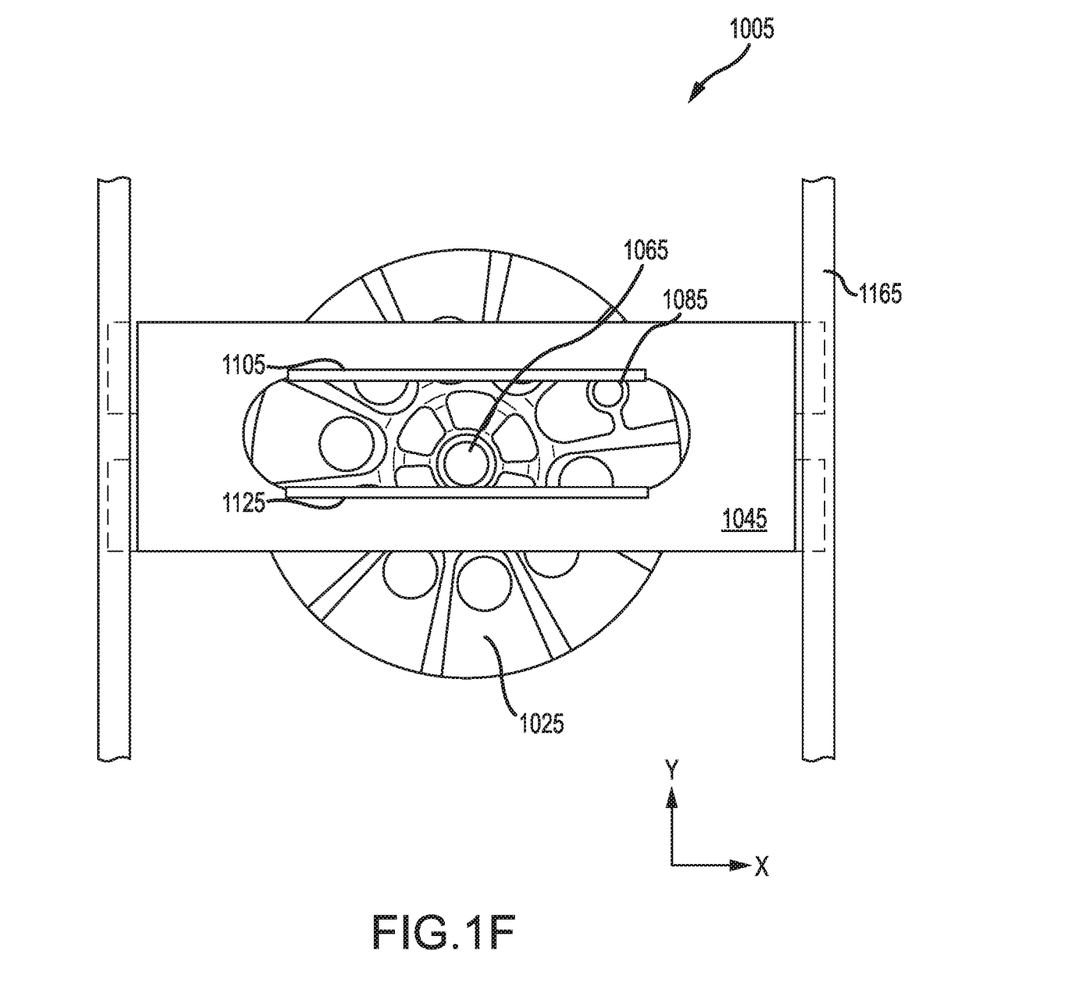
FIG. 1F illustrates a swivel stop, in accordance with various embodiments.

With reference now to FIGS. 1F and 3B, in accordance with various embodiments, a swivel stop 1005 comprises a brake plate 1025 disposed proximate a second plate 1045. A first boss 1085 and an axle 1065 are coupled to the brake plate 1025. Second plate 1045 has a first interference surface 1105 and a second interference surface 1125. Second plate 1045 is coupled to rail 1165 and is configured to translate along rail 1165 in the y-direction. The axle 1065 and the first boss 1085 are disposed in an axle clearance cutout, such as cutout 326. At least one of the first interference surface 1105 or second interference surface 1125 may be coincident with a portion of an axle clearance cutout, such as cutout 326, and tend to allow the axle 1065 to translate, with respect to the second plate 1045, in the x-direction. As brake plate 1025 rotates clockwise with respect to the second plate 1045, the first boss 1085 tends to contact the second interference surface 1125 and the axle 1065 tends to contact the first interference surface 1105 thereby tending to limit the clockwise rotation of the brake plate 1025. As brake plate 1025 rotates counter-clockwise with respect to the second plate 1045, the first boss 1085 tends to contact the first interference surface 1105 and the axle 1065 tends to contact the second interference surface 1125 thereby tending to limit the counter-clockwise rotation of the brake plate 1025.

Figure 6:
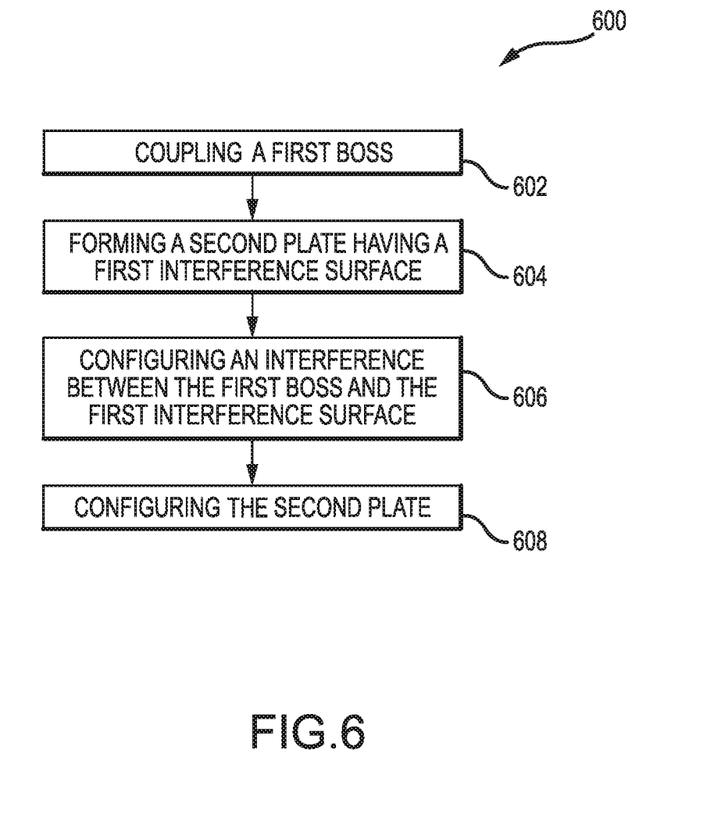
FIG. 6 illustrates a method of manufacturing a swivel stop, in accordance with various embodiments.

In various embodiments and with reference now to FIG. 6, a method 600 of manufacturing a swivel stop may comprise coupling a first boss 602 and a second boss to a rotating member, forming a second plate 604 having a first interference surface and a second interference surface, and configuring an interference 606 between the first boss and the first interference surface and the second boss and the second interference surface such that the rotation of the rotating member with respect to the second plate tends to be limited when the second plate is disposed proximate the rotating member. With combined reference to FIGS. 6, 2A, and 2B configuring an interference 606 may comprise coupling a first boss, such as first boss 208, to a rotating member, such as first plate 202, at an angle from a second boss, such as second boss 206, about the axis of rotation of a rotating member, such as first plate 202. Forming may comprise subtractive manufacturing such as casting, forging, milling, grinding, machining, and the like. Forming may also comprise additive manufacturing. The method may further comprise configuring the second plate 608 to translate along a rail.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of manufacturing a swivel stop comprising:
   coupling a first boss and a second boss to a rotating member, wherein the first boss is coupled 180 degrees apart from the second boss as measured about an axis of rotation of the rotating member and wherein the rotating member comprises a circular disk;
   forming a plate having a first interference surface and a second interference surface, wherein the plate is disposed proximate to the rotating member and wherein the rotating member rotates relative to the plate;
   configuring a first interference between the first boss and the first interference surface and a second interference between the second boss and the second interference surface to limit a rotation of the rotating member with respect to the plate; and
   configuring the plate to translate along a rail, wherein the plate translates along the rail in a direction perpendicular to an axis of rotation of the rotating member.

2. The method of claim 1, further comprising locating the first boss in an aperture defined by the plate.

3. The method of claim 1, further comprising configuring the first interference between the first boss and the first interference surface to limit the rotation of the rotating member with respect to the plate to a range of 0 degrees to about 30 degrees.

4. The method of claim 1, further comprising coupling an axle to the rotating member.

5. The method of claim 4, further comprising locating the axle in an axle clearance cutout defined by the plate.

6. The method of claim 5, further comprising locating the first boss the axle clearance cutout defined by the plate.

7. The method of claim 5, further comprising locating the first boss in an aperture defined by the plate.

8. The method of claim 5, further comprising locating the axle in a brake plate cutout defined by a pedestal, wherein the axle is configured to translate within the brake plate cutout.

* * * * *